(12) United States Patent
Gavrilovic et al.

(10) Patent No.: US 11,445,169 B2
(45) Date of Patent: Sep. 13, 2022

(54) CAMERA IMAGE AND SENSOR FUSION FOR MIRROR REPLACEMENT SYSTEM

(71) Applicant: Orlaco Products B.V., Barneveld (NL)

(72) Inventors: Milan Gavrilovic, Uppsala (SE); Frans Kievith, Leusden (NL); Bárbara Martín Leung, Solna (SE); Annette Lef, Stockholm (SE); Parinaz Kasebzadeh, Solna (SE)

(73) Assignee: Stoneridge Electronics, A.B., Solna (SE)

( * ) Notice: Subject to any disclaimer, the term of this patent is extended or adjusted under 35 U.S.C. 154(b) by 80 days.

(21) Appl. No.: 16/944,338

(22) Filed: Jul. 31, 2020

(65) Prior Publication Data
US 2021/0037236 A1 Feb. 4, 2021

Related U.S. Application Data (60) Provisional application No. 62/881,506, filed on Aug. 1, 2019.

(51) Int. Cl.
| | |
|---|---|
| H04N 7/18 | (2006.01) |
| H04N 17/00 | (2006.01) |
| G06T 7/70 | (2017.01) |
| G01C 9/00 | (2006.01) |
| G01C 19/00 | (2013.01) |
| G01P 3/42 | (2006.01) |
| G01P 13/00 | (2006.01) |

(Continued)

(52) U.S. Cl.
CPC ............. *H04N 17/002* (2013.01); *G01C 9/00* (2013.01); *G01C 19/00* (2013.01); *G01P 3/42* (2013.01); *G01P 13/00* (2013.01); *G01P 15/08* (2013.01); *G01P 15/18* (2013.01); *G06T 7/20* (2013.01); *G06T 7/70* (2017.01); *H04N 5/247* (2013.01); *B60R 1/00* (2013.01); *B60R 2300/8046* (2013.01); *G06T 2207/20081* (2013.01); *G06T 2207/30244* (2013.01); *G06T 2207/30252* (2013.01)

(58) Field of Classification Search
CPC ....... G01B 11/24; G03B 11/00; G03B 11/043; G03B 11/045; G03B 17/02; G03B 17/561; G03B 17/24; G08B 13/19663; G08B 13/19673; G08B 13/19691; G08B 13/19695; H04N 21/42222; H04N 5/23206; H04N 5/23218; H04N 5/23296
USPC .......................................................... 348/148
See application file for complete search history.

(56) References Cited

U.S. PATENT DOCUMENTS

2012/0307086 A1* 12/2012 Jefremov ........... H04N 5/23267
348/208.4
2015/0185018 A1 7/2015 Hesch et al.
(Continued)

OTHER PUBLICATIONS

Wikipedia, Convolutional neural network, accessed Jan. 10, 2020, pp. 1-28.
(Continued)

*Primary Examiner* — Masum Billah
(74) *Attorney, Agent, or Firm* — Carlson, Gaskey & Olds, P.C.

(57) ABSTRACT

A measurement system for a vehicle including a first camera defining a field of view having a corresponding optical axis, and a motion detection sensor mechanically fixed to the first camera such that the motion detection sensor is configured to detect motion of the optical axis.

18 Claims, 4 Drawing Sheets

(51) Int. Cl.
  *G01P 15/08* (2006.01)
  *G01P 15/18* (2013.01)
  *G06T 7/20* (2017.01)
  *H04N 5/247* (2006.01)
  *B60R 1/00* (2022.01)

(56) References Cited

U.S. PATENT DOCUMENTS

| | | | |
|---|---|---|---|
| 2015/0312488 A1* | 10/2015 | Kostrzewa | H04N 5/378 |
| | | | 348/164 |
| 2018/0188032 A1* | 7/2018 | Ramanandan | G01C 21/165 |
| 2018/0211118 A1* | 7/2018 | Diessner | H04N 5/14 |
| 2019/0068829 A1* | 2/2019 | Van Schoyck | G06T 7/70 |
| 2019/0164310 A1* | 5/2019 | Noble | G06T 7/74 |
| 2019/0346844 A1* | 11/2019 | Chen | B60W 60/00 |

OTHER PUBLICATIONS

International Search Report and Written Opinion for International Application No. PCT/EP2020/071512 dated Oct. 21, 2020.
International Preliminary Report on Patentability for International Patent Application No. PCT/EP2020/071612 dated Feb. 1, 2022.

* cited by examiner

CAMERA IMAGE AND SENSOR FUSION FOR MIRROR REPLACEMENT SYSTEM

CROSS-REFERENCE TO RELATED APPLICATION

This application claims priority to U.S. Provisional Application No. 62/881,506 filed on Aug. 1, 2019.

TECHNICAL FIELD

The present disclosure relates generally to a structure for generating a video feed data set including a fusion of image data from a camera and motion data from a corresponding motion indicator.

BACKGROUND

Mirror replacement systems, such as those used in commercial vehicles, utilize one or more cameras to provide an enhanced field of view to a vehicle operator. The mirror replacement systems cover a larger field of view than a conventional mirror. As part of the operation of the mirror replacement system, substantial amounts of image data is generated by the camera within each mirror replacement structure. In addition to the mirror replacement system, other vehicle systems can include or utilize cameras as well. The image data from the cameras can be analyzed by a controller and used to perform multiple functions that enhance operation of the vehicle and the mirror replacement.

SUMMARY

In one exemplary embodiment, a measurement system for a vehicle includes a first camera defining a field of view having a corresponding optical axis, and a motion detection sensor mechanically fixed to the first camera such that the motion detection sensor is configured to detect motion of the optical axis.

In another example of the above described measurement system for a vehicle the motion detection sensor includes one of an accelerometer, a gyroscope, and an inclinometer.

In another example of any of the above described measurement systems for a vehicle the motion detection sensor is mechanically connected to an application specific integrated circuit (ASIC) of the first camera such that motion of the ASIC corresponds to motion of the optical axis in a one to one fashion.

In another example of any of the above described measurement systems for a vehicle the ASIC is configured to output a fused data set comprising a combination of image data generated by the first camera and motion data generated by the motion detection sensor.

In another example of any of the above described measurement systems for a vehicle the fused data is time correlated data.

Another example of any of the above described measurement systems for a vehicle further includes a controller configured to receive the fused data set, the controller being configured to analyze the fused data set using a machine learning based analysis.

In another example of any of the above described measurement systems for a vehicle the machine learning based analysis is configured to determine an orientation of the camera and alert an operator in response to the first camera facing an incorrect direction.

In another example of any of the above described measurement systems for a vehicle the ASIC is connected to a controller, the controller being configured to receive a motion sensor output and a camera output, and wherein the controller is configured to fuse the motion sensor output and the camera output thereby creating a fused data set.

In another example of any of the above described measurement systems for a vehicle the fused data set is created using an automotive safety integration level (ASIL) decomposition fusion.

In another example of any of the above described measurement systems for a vehicle the fused data set is provided to at least one of a camera orientation monitor system, an object detection system, a camera misalignment system, a field of view adjustment system, an object detection redundancy system, an image stabilization system, an end of line calibration system, a tamper recognition system, and an automatic camera panning system, a camera displacement detection system, and a blockage detection system.

In another example of any of the above described measurement systems for a vehicle the fused data set is provided to the blockage detection system, and wherein the blockage detection system compares image based motion detection and sensor based motion detection of the fused data to determine when the camera is at least partially blocked.

In another example of any of the above described measurement systems for a vehicle the fused data set is provided to the camera displacement detection system, and wherein the camera displacement detection system is configured to compare a speed of motion detected via image analysis with a speed of motion detected via sensor analysis and determine a camera displacement has occurred in response to the speed of motion detected via the image analysis exceeding speed of the motion detected via the sensor analysis by a predetermined amount.

In another example of any of the above described measurement systems for a vehicle further includes a plurality of second cameras, each of the plurality of second cameras defining a field of view having a corresponding optical axis, and a plurality of motion detection sensors each of the motion detection sensors in the plurality of motion detection sensors being mechanically fixed to a corresponding one of the second cameras in the plurality of second cameras via a corresponding application specific integrated circuit (ASIC), wherein a motion of each camera in the plurality of second cameras and a motion of the first camera is determined independently of the motion of each other camera.

In another example of any of the above described measurement systems for a vehicle each of the corresponding ASICs are configured to output a fused data set comprising a combination of image data generated by the corresponding camera and motion data generated by the motion detection sensor.

An exemplary method for detecting a blocked camera lens for a vehicle includes receiving image data and inertial motion unit (IMU) data from a camera system, analyzing the IMU data to detect motion of the camera system using a sensor based motion detection system, analyzing the image data to detect motion of the camera using an image based motion detection analysis, and determining a presence of an at least partially blocked lens in response to the image based motion detection analysis indicating no motion and the sensor based motion detection indicating motion.

In another example of the above described method for detecting a blocked camera lens for a vehicle the camera system includes a first camera defining a field of view having a corresponding optical axis and a motion detection sensor mechanically fixed to the first camera such that the motion detection sensor is configured to detect motion of the optical axis.

In another example of any of the above described methods for detecting a blocked camera lens for a vehicle the image based motion detection analysis includes identifying a reference in a first frame of the image data, identifying the reference in a second frame of the image data, and determining that the camera system is in motion in response to a change in position of the reference between frames being in excess of a threshold.

In another example of any of the above described methods for detecting a blocked camera lens for a vehicle the second frame is subsequent to the first frame.

In another example of any of the above described methods for detecting a blocked camera lens for a vehicle the image data and the IMU data are a single fused data set.

In another example of any of the above described methods for detecting a blocked camera lens for a vehicle the image data and the IMU data are fused while determining the presence of an at least partially blocked lens.

An exemplary method for detecting a displaced camera system for a vehicle includes receiving fused data including an image portion and an inertial motion unit (IMU) portion from a camera system, analyzing the image portion using an image based motion detection system and determining at least one parameter of motion in at least one object within the image, analyzing the IMU portion using a sensor based motion detection system and determining at least one parameter of motion of the IMU, and comparing the at least one parameter of motion of the at least one object in the image and the at least one parameter of motion of the IMU, and determining a camera system displacement has occurred when the at least one parameter of motion of the at least one objection differs from the motion of the IMU by at least a predefined amount.

In another example of the above described method for detecting a displaced camera system for a vehicle the at least one parameter is a speed of motion.

In another example of any of the above described methods for detecting a displaced camera system for a vehicle the at least one object within the image is at an outer periphery of the image.

In another example of any of the above described methods for detecting a displaced camera system for a vehicle further includes determining an at least partial blockage of the camera in response to the image based motion detection system detecting no motion and the sensor based motion detection system detecting motion.

DETAILED DESCRIPTION

Figure 1:
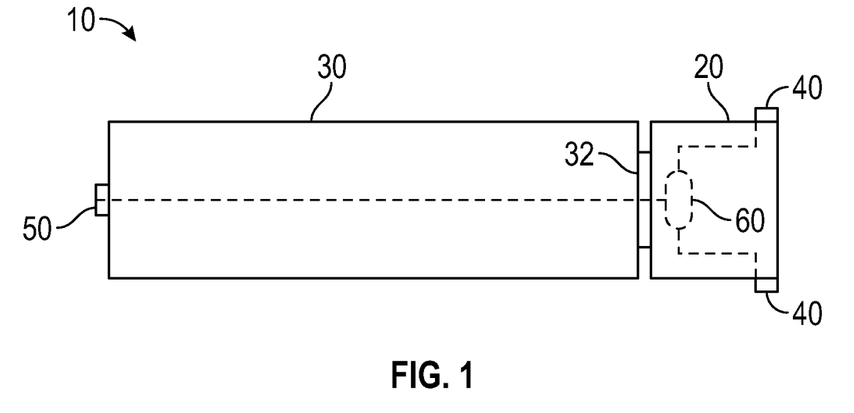
FIG. 1 illustrates an exemplary commercial vehicle including a mirror replacement system.

FIG. 1 schematically illustrates a commercial vehicle 10, such as a tractor trailer. The exemplary commercial vehicle 10 includes a cab 20 and a trailer 30. The trailer 30 is connected to the cab 20 via a hitch 32, or other connection. Also, connected to the cab 20 are multiple side view cameras 40, each of which communicates with a controller 60 and generates a digital image of a side view of the vehicle 10. Attached to the trailer 30 is a rear view camera 50. As with the side view cameras 40, the rear view camera 50 communicates with the controller 60 and provides an image feed to the controller 60. While illustrated in FIG. 1 via a simplified three-camera system, it is appreciated that mirror-replacement systems can include any number of additional cameras disposed in similar locations, or distributed about the vehicle 10 in any required configuration.

Figure 2:
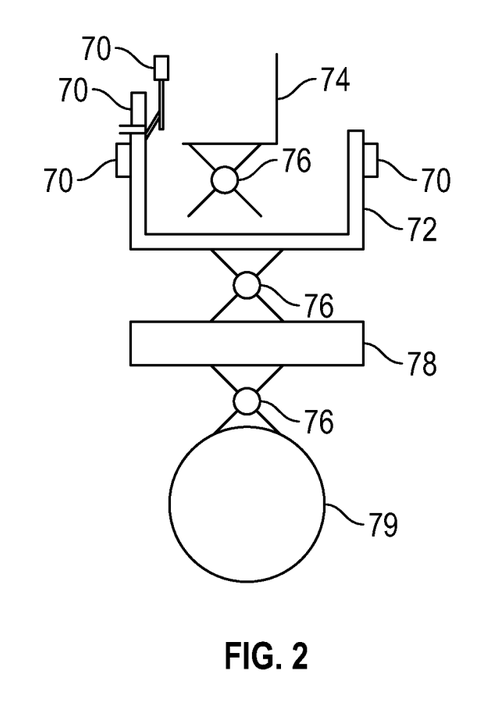
FIG. 2 schematically illustrates an exemplary cab and driver suspension for a vehicle including multiple vehicle systems having cameras.

With continued reference to the vehicle of FIG. 1, FIG. 2 schematically illustrates an exemplary cab 72 and driver seat 74 configuration including multiple cameras 70 disposed in the cab 72. In the example of FIG. 2, the driver's seat 74 is mounted to the cab 72 via a suspension 76. The cab 72 is, in turn mounted to the vehicle frame 78 via another suspension 76. The frame 78, in turn is mounted to the tires 79 via another vehicle suspension 76. As a result of the multiple suspensions 76, each of the components is able to move (or float) relative to the other components. As a result, the vehicle motion (i.e. motion of the vehicle frame 78) does not correlate on a 1:1 basis with motion of the cab 72, motion of the driver seat 74, or the motion of sensors connected to the cab 72 or driver's seat 74. In addition to the simplified mirror replacement system of FIG. 1, the systems of FIG. 2 illustrate multiple additional cameras 70 mounted within, or to, the cab 72. Due to the multiple suspensions 76, each of the cameras 40, 50, 70 moves independently, or semi-independently, from some or all of the other cameras 40, 50, 70. This, in turn, renders vehicle frame movement measurements insufficient to track movement of the cameras 40, 50, 70.

The controller 60 within the vehicle 10 receives and formats the image data generated by each of the cameras 40, 50, 70 and presents the image data to an operator of the vehicle 10 to assist in controlling the vehicle 10. In addition to presenting the image data to the operator, the controller 60 analyzes the data in real time, or near real time, and performs augmentations to the data based on the analysis. In some examples, the augmentations can include determining foreign objects present in the image, excluding ego parts from further image analysis, detection of imminent collisions with identified objects, as well as any other number of driver assistance functions. The augmentations are applied to the image prior to presenting the image to the operator, and allow the controller 60 to highlight, or otherwise emphasize, elements of the image that the operator should be aware of and/or information about the image that the operator should be apprised of.

Some of the driver assistance functions, or other features that use the image data, utilize contextual information within the image feed itself, coupled with algorithms determined using machine learning systems to determine orientation of the cameras 40, 50, 70, blockages within the field of view, incoming vehicles or objects for a collision detection system, etc. Image analysis for these systems is impeded by the fact that the camera 40, 50 may be moving and in some cases may be moving independently, or semi-independently, from the cab 20 of other portions of the vehicle 10. By way of example an object collision with a camera 40, 50 can result in a shift in orientation of the camera 40, 50 and the independent motion renders determining the difference between normal movement and the movement resulting from an object collision difficult. By way of another example, there is a degree of float (i.e. relative motion) between the cameras 70 that are mounted to the cab 72, and the vehicle frame 78, as well as a degree of float between the angling of the images generated by the various cameras 40, 50, 70 due to the presence of multiple cumulative suspensions 76.

In addition to mirror replacement systems, such as those described and illustrated in FIG. 1, the integrated inertial measurement unit (IMU) and camera configurations described herein can be applied to all of the cameras 40, 50, 70 as well as to other similar vehicle camera systems.

Figure 3:
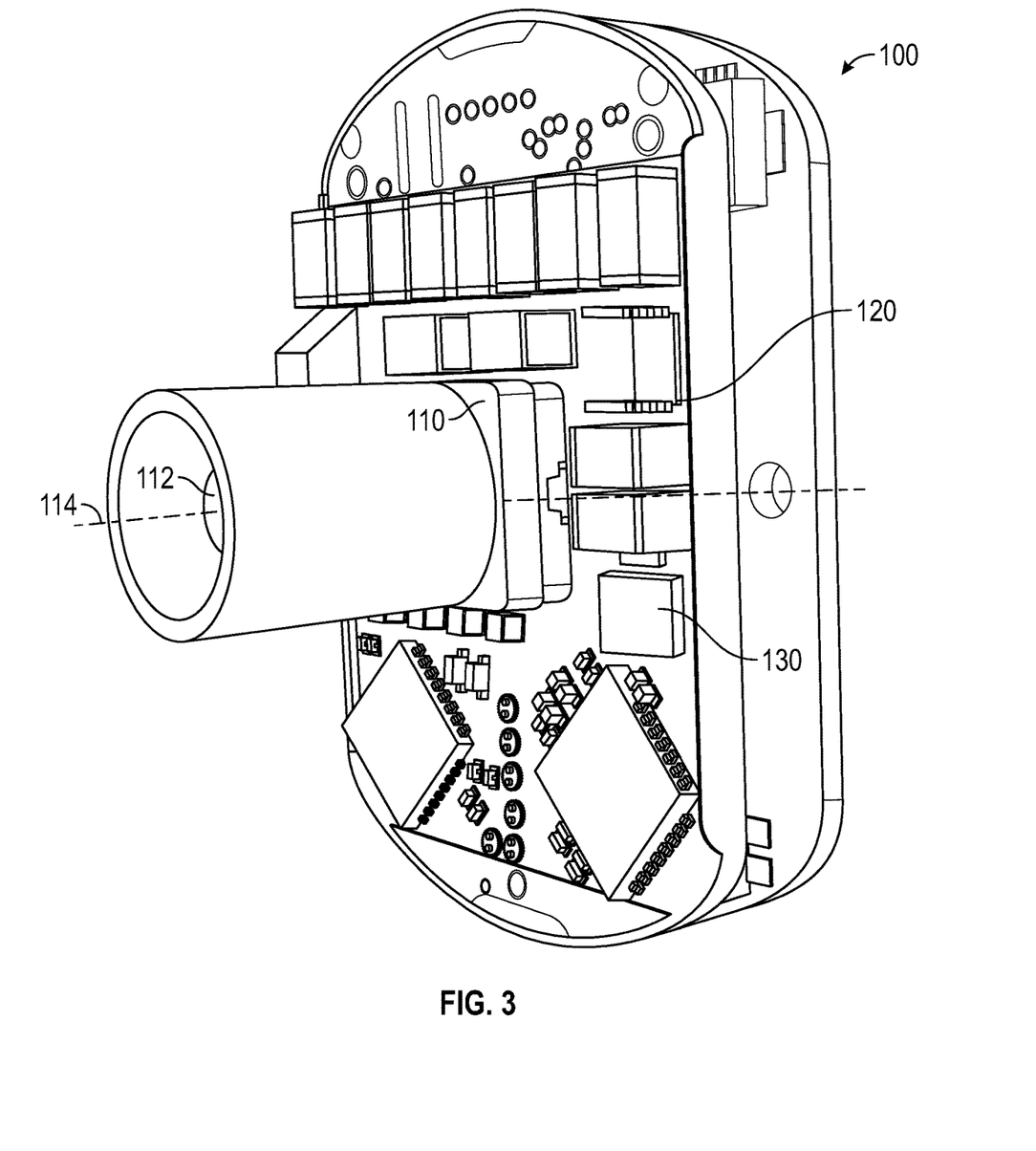
FIG. 3 schematically illustrates an exemplary mirror replacement camera for utilization in the vehicle of FIG. 1.

With continued reference to FIG. 1, FIG. 3 schematically illustrates an exemplary camera apparatus 100 including a camera 110 mounted to an application specific integrated circuit (ASIC) 120. The camera 110 includes a lens 112, and the lens 112 defines a field of view (i.e. the image that is captured by the camera 110). A lens axis 114 is a line drawn normal to the lens 112 and normal to the field of view. Also connected to the ASIC 120 is an inertial measurement unit (IMU) 130. The IMU 130 can contain an accelerometer (e.g. a three axis accelerometer), a gyroscope (e.g. a three axis gyroscope), an inclinometer, any combination thereof, or any other sensor type, or combination of sensor types, configured to detect a relative motion. The exemplary IMU 130 is configured to detect motions including roll, pitch and yaw. Alternative IMU's can detect a subset of these motions and/or additional motions.

As both the camera 110 and the IMU 130 are physically mounted to the single ASIC 120, the axis 114 of the camera 110 is physically tied to the IMU 130, and any movement of the IMU 130 corresponds to a movement of the camera 110. In alternative examples the camera 110 and the IMU 130 can be physically connected via connectors, or any other rigid connection causing motion of the axis 114 to correspond to motion of the IMU 130. Thus, the field of view defined by the camera 110 and the motion of the IMU 130 are correlated in a one to one fashion. In alternative examples, the IMU 130 can be mounted to a distinct physical structure, or a second ASIC and provide similar functionality, provided the IMU 130 and the axis 114 are mechanically fixed relative to each other. As used herein, mechanically fixed relative to each other refers to a configuration where the two components are connected such that the two components move as a single unit.

During operation of the vehicle 10, the image data from the camera 110 and the motion data from the IMU 130 is fused prior to being provided to the controller 60 (FIG. 1). In other examples, the image data and the motion data each include a time stamp, and the controller 60 can fuse the data into a single data set after having received the data from each. In one example, the fusion can be achieved using an Automotive Safety Integration Level (ASIL) decomposition fusion method. In alternative examples, alternative methods of fusing the data from the cameras 40, 50, 70 to the data from the IMU 130 can be utilized according to any known data fusion method. As each camera 40, 50, 70 includes its own motion sensor, the motion data fused to the image data from the camera 40, 50, 70 is tied to the specific camera axis rather than the motion of the vehicle body.

Once the controller 60 has received the fused data, the controller 60 utilizes the combination of motion data and image data to perform multiple analytics and to enhance the functionality of additional control features.

In one example, the controller 60 analyzes the image data to determine relative motion of the axis 114 and analyzes the motion data received from the IMU 130 and a comparison between the analysis is used as a monitor function. In this example, the motion data from the IMU 130 acts to verify the accuracy of the motion detected via image analysis. If the image analysis data does not match the motion data from the IMU 130, then the controller 60 can determine that the motion from the analysis of the image data is incorrect, and adjust accordingly. Whether the determination is that the image analysis or that the IMU 130 data is faulty depends on the context of the determination and can include analysis of the image for components that should have a fixed position within the image, of expected movement of objects identified in the image. Once a determination has been made, the controller 60 can perform any required adjustments to the mirror replacement system in order to maintain operability of one or more functions of the mirror replacement system. One particular example of a comparison process is described below with reference to FIGS. 4 and 5.

In another example, the IMU 130 detects or measures roll, pitch and yaw and allows the controller 60 to determine camera inclination at each frame of the image. Detection of the camera inclination allows for the controller 60 to perform a short run check to ensure that the camera 110 is oriented in the correct position and has not been displaced. This in turn assists with object detection and enhances the ability of the controller 60 to determine the location of an object, relative to the vehicle 10, by adjusting for a misalignment of the optical axis 114 and an acceleration axis of the vehicle 10.

In another example where the IMU 130 detects or measures the roll, pitch and yaw, by the IMU 130 can detect a sudden alteration in the camera inclination. By way of example, if a camera 40, 50, 70 is struck by a low hanging branch, a rock kicked up by another vehicle, or any other foreign object, the camera 40, 50, 70 can shift positions without becoming fully dislodged from the vehicle 10. When such a sudden orientation change occurs, the field of view of the camera 40, 50, 70 can be substantially altered and needs to be readjusted. In vehicles 10 that are properly equipped, a rear axis, or other structural portion of the vehicle 10 can have its height adjusted on the fly to compensate for the change to the field of view corresponding to the sudden motion detected by the IMU 130. In alternative examples, any other mechanical system for adjusting the camera 40, 50, 70 can be utilized to similar effect. In yet other examples, a warning can be provided to the vehicle operator indicating that the operator is required to manually adjust or reposition the camera at the first opportunity. In some examples, the sudden position change can be detected with an IMU 130 capable of detecting only one or two angles of motion, and full motion detection is not required.

In another example, the fused data from the IMU 130 operates as an additional sensor for a safety check warning for blockage similar to the relative motion analysis described above. In this example the fused motion data provides redundancy checks on the image based motion detection and ego-part vehicle information detected from a CAN system. The additional sensor information measures whether the vehicle is moving or rotating, and provides redundancy checks on object detection within the image and on image blockage detection. By way of example, if the IMU 130 portion of the data detects movement at a specific speed or rotation about an axis, but the image presents a mostly static scene, the controller 60 can alert the operator of a change in confidence of the detected objects. In another example, if the vehicle 10 moves, or rotates about an axis and the fused image data does not change and the image analysis does not indicate a blocked camera 110, the controller 60 can re-run an image blockage detection algorithm or inform the operator that motion from the IMU 130 and the image blockage detection algorithm disagree.

In yet another example, the fused image and IMU 130 data can be utilized to assist in a video stabilization feature of the controller 60. When an operator, such as a driver, is located within the vehicle 10 itself, the operator shakes or floats along with the cabin 20. The cabin 20 in turn shakes or floats at approximately the same magnitude as the camera 110 and can self-interpret the image. However, when the operator is remotely located via a remote control operation scheme, it is important to provide visual stabilization of the images provided by the cameras 110. In such a case, the controller 60 can compare the relative motion between frames of the image data and compensate for the relative motion in the video feed provided to the remote operator. This can reduce the required sampling rate for video stabilization and potentially reduce the amount of filtering required by the controller 60 in order to implement the stabilization.

In another example, the fused data can be used by the controller 60 to reduce end of line calibration requirements by enhancing object detection capabilities and to calibrate the end of line system. In another example, the fused data can be used to assist in tampering recognition, and in automatic camera panning systems. It is further understood that any of the above described concepts can be used alone or in combination with any or all of the other above described concepts.

Figure 4:
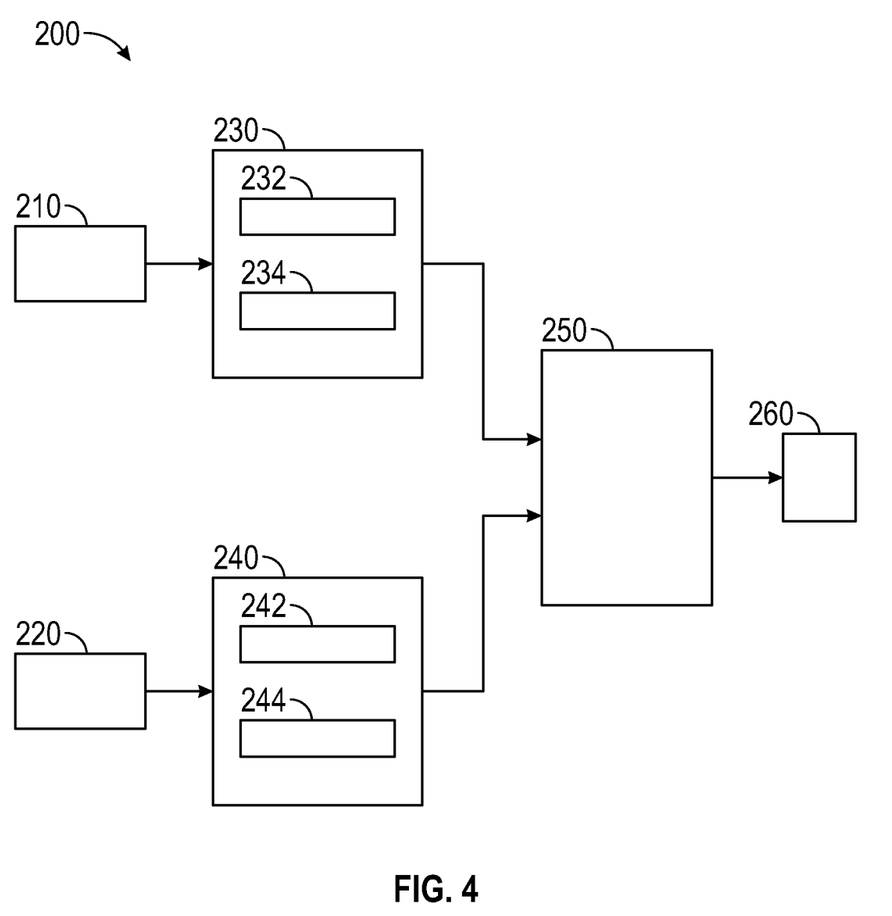
FIG. 4 schematically illustrates a process by which a controller uses fused image and sensor data to detect camera blockage.
Figure 5:
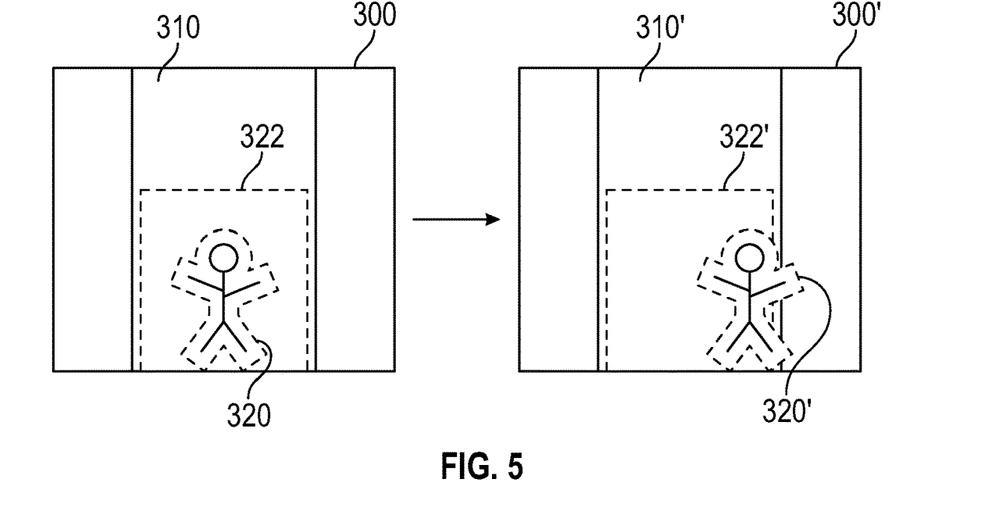
FIG. 5 schematically illustrates an exemplary image feed for use in the process of FIG. 4.

With continued reference to FIGS. 1-3, FIGS. 4 and 5 illustrate one example process 200 by which fused motion data enabled by the fixed relationship between the camera viewing axis and the IMU, described above with regards to FIGS. 1-3, is utilized to verify a blocked or unblocked state of the camera. The controller performing the operation receives image data 210 from a camera, and receives IMU data 220 from the corresponding IMU. The IMU is an accelerometer in one example although alternative IMU sensor types can be used to similar affect in alternative systems. The controller then analyzes the image data 210 using an image based motion detection analysis 230 to determine if the image indicates motion. Simultaneously, or approximately simultaneously, the controller analyzes the IMU data 220 in an IMU analysis block 240. The resulting analysis is compared in a comparison 250, and a warning 260 is output by the controller when the camera indicates a lack of motion and the IMU indicates the presence of motion. The warning 260 informs the vehicle operator, as well as other vehicle systems, that the camera providing the image data 210 includes a visual obstruction and should not be relied on for certain vehicle systems.

Referring now to the image based motion detection analysis block 230, in one example the image based detection analysis block 230 includes two sub-blocks, a feature extraction program 232 and a motion detection program 234. The image based motion detection analysis block 230 uses feature extraction based image analysis methods. Initially, one or more features of the image are extracted from the image via the feature extraction program 232. In some examples the features can be features within a region of interest of each frame. Once the features are extracted, the motion detection program 234 tracks the motion of the features across sequential frames.

In one example, illustrated in FIG. 5, the motion is tracked using a template matching approach. In the template matching approach, the motion detection program 234 attempts to find a best match with a pre-defined template 320 (e.g. a human shape) within at least a portion 310 of the frame 300. The motion template matching system extracts the reference image for the template 320 from a first frame 300 of the video, and then applies the reference image to subsequent frames 300', thereby allowing the system to track movement of the reference image 320, 320' across the frame 300' or the portion 310' of the frame 300, 300'. In some examples, the subsequent frame 300' can be any frame that is subsequent to the first frame 300, including a frame that immediately follows the first frame. In alternative examples, the subsequent frame 300' is a frame that is separated from the first frame by a time period that is larger than the time between frames, resulting in one or more frames not being included in the image based analysis. While illustrated in the example as a human shape, it is appreciated that the reference image can be any unique shape within the first image, and the utilization of a human shape for the reference image is purely exemplary. In further examples, multiple references can be used in a single image feed to provide independent movement tracking, thereby allowing for redundant tracking and/or verification of the image based movement tracking.

In one example algorithm for performing the motion tracking, the portion 310, 310' of the frame 300, 300' that is searched is limited to a region 322 of the frame that is sized to be twice the size of the template of the reference image 320. The sizing limits the search region to an area of the image 310, 310' where the reference image would reasonably travel to if the vehicle was in motion. Limiting the region of the image that is searched in subsequent frames 300, 300' of the image feed reduces the processing power and time required to perform the image analysis in the motion detection program 234. In alterative examples, alternatively sized regions 322 that are sized based on the size of the reference image can be utilized to similarly reduce the processing required in the motion detection program 234.

Once instances of the reference image are identified in subsequent frames 300, 300' the x-y distance that the reference image traveled is analyzed to determine whether the vehicle is moving or stationary. When the motion detection program 234 determines that no motion is present, the vehicle is known to be in one of two states. In the first state, the vehicle is not in motion. In the second state, the camera providing the feed for the image is blocked or partially blocked. One of skill in the art will appreciate that these states are not mutually exclusive.

While described above within the context of the reference element being a detected object within the image, alternative methodologies according to this description can include alternative features including, but not limited to, identifying a distance to regions of the image, multimodal image registration, correlating features of each frame, and the like. The term "reference" utilized herein applies to any form of reference and is not limited in scope to object identification. In another alternative, the movement detection can be via an optimization problem that maximizes correlation between a subsequent frame and a reference frame according to known methodologies.

Referring now to the IMU analysis block 240, the operations of the IMU analysis block 240 within the controller can be segregated into two separate groups. Initially the data 220 from the IMU sensor(s) is processed using a pre-processing procedure 242 that converts the electrical signals from the sensor(s) into workable information. By way of example, when the sensor(s) include an accelerometer, such as a 3-axis accelerometer, the sensor(s) measure forces in three axes. When not in motion, the vertical axes measures only the acceleration of gravity straight upwards, while the other axes measure zero plus or minus noise. While in motion, one or both of the other axes will output measurements indicative of the direction and rate of motion of the vehicle. The vehicle controller is configured to pre-process the electrical signals output by the accelerometer to determine which direction, and how fast, the vehicle is moving based on the IMU sensor data 220. The pre-processing can be any methodology for converting signals to motion data that corresponds to the specific sensor types providing the IMU sensor data 220.

Once processed into motion data, the IMU analysis block 240 uses the sensed motion data to determine if the vehicle is in motion or not in motion in a motion detection process 244. As with the image based detection, the IMU detection will indicate that the vehicle can be in one of two states. The first state is a vehicle in motion and the second state is a vehicle not in motion. In some examples, the motion detection process 244 determines the specific direction and rate of motion of the vehicle, while in other examples, the motion detection process 244 is limited to detecting the binary state of whether the vehicle is in motion or not.

After determining whether the vehicle is in motion or not in motion using both the image data 210 and the sensor data 220, the data is fused in the comparison module 250 via a timestamp correlation. In alternative systems, alternative methodologies for coordinating the data from the IMU and from the camera can be utilized in place of the timestamp configuration to similar effect.

Once fused, the comparison 250 samples the data stream for an "in motion"/"not in motion" disagreement between the image data 210 and the sensor data 220. Then the comparison 250 determines that the image data 210 indicates no motion and the sensor data 220 indicates motion, the comparison process 250 recognizes that a blocked, or partially blocked (otherwise referred to as occluded) camera is present and outputs an alert 260. The alert 260 is provided to other systems and/or a vehicle operator as described above with regards to FIGS. 1-3.

In another example, a controller receiving the fused data from the camera and the IMU, or a controller fusing the data from the camera and the IMU, can utilize separate detections of motion from image based analysis and sensor based analysis to determine the occurrence of an event based on a difference between the detected motions. One such event is a displacement of the camera such as can occur when a camera housing makes contact with a foreign object, such as a tree or infrastructure, during operation of the vehicle. In alternative examples, alternative events can be detected via similar comparisons.

With continued reference to FIGS. 1-5, FIG. 6 illustrates an analysis method 500 for determining a displacement of the mirror replacement system including the camera and the IMU. Initially, the controller performing the process receives the fused data and performs a sensor based motion analysis 510 and an image based motion analysis 520 across a defined time period. The image based motion analysis 520 can utilize any existing motion detection analysis including machine learning derived analysis, vector analysis and the like to determine a motion of at least one object within the image. In one example, the at least one object is identified at tracked at the periphery of the image. Tracking an object at the periphery of the image ensures that a discrepancy between the speed of the object and the speed sensed by the IMU is maximized in the event of a displacement. Similarly, the sensor based motion analysis 510 detects motion using the sensor signals from the IMU that is mechanically fixed relative to the camera axis using any conventional motion detection configuration.

Figure 6:
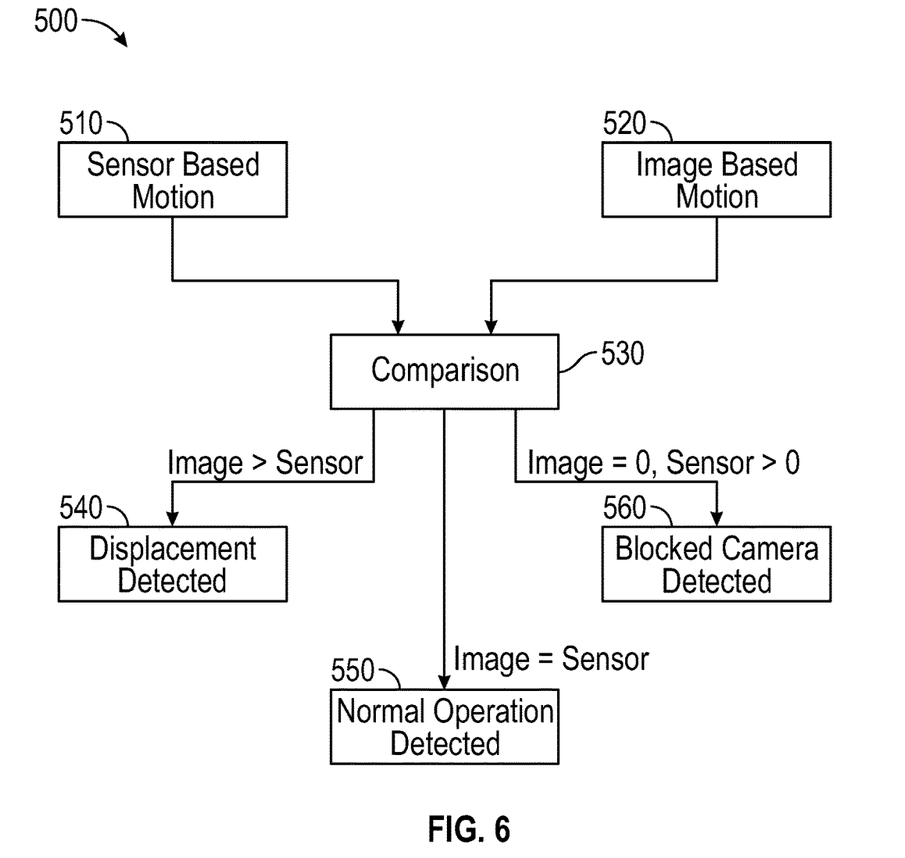
FIG. 6 illustrates a process for detecting a displacement of a camera using the fixed relationship within the camera system illustrated in FIGS. 1-3.

In the example process of FIG. 6, the sensor based motion analysis 510 and the image based motion analysis 520 is configured to detect, among other possible parameters, a speed of the motion. In alternative examples, alternative motion parameters can be detected in addition to, or along with, the speed of the motion and utilized in the corresponding comparison. Once the motion across the time period is determined in each of the sensor based motion analysis 510 and the image based motion analysis 520, the determined motion is compared in a comparison step 530.

In the illustrated example, the determined motion includes a speed of the motion measured by the IMU and a speed of motion of one or more objects detected at a periphery of an image frame of the camera. The comparison checks to see if the speed of the motion detected by the image based motion analysis 520 exceeds the speed of the motion detected by the sensor based motion analysis 510 by above a predetermined amount. The controller determines that a displacement of the camera and IMU has occurred in a displacement detected step 540 when the discrepancy exceeds the predetermined amount. The predetermined amount can be selected to be an expected margin of error of the image based detection analysis 520 such that detection of motion from the image in excess of the predetermined amount indicates that the speed of the motion at the periphery of the image exceeds the speed of the motion sensed by the IMU. This in turn indicates that the camera is being displaced.

When the motion detected by the image based motion analysis 520 is at approximately the same speed (e.g. within the margin of error discussed above) as the motion detected by the sensor based motion analysis 510, the comparison 530 determines that normal operations are occurring in a normal operations detected step 550.

In some iterations of the process 500, the blocked camera detection process described above with regards to FIGS. 4 and 5 can be incorporated as well. In such iterations, when the comparison module 530 detects that the image based motion analysis is 0 and the sensor based motion analysis is greater than 0 (i.e. the IMU detects motion), the controller determines that the camera is blocked in a Blocked Camera Detected step 560.

While described above in general reference to a vehicle environment where the entire vehicle is in motion, it is appreciated that in some examples, the motion detected can include movement of the camera and IMU due to shutting a door, a collision between the housing of the camera and IMU and a foreign object, vibrations of an idling engine, or any other source of camera and IMU movement outside of motion of the entire vehicle. It is appreciated that the type of movement data detected by the IMU impacts the practical applications of the fused data generated herein.

Although example embodiments of this invention have been disclosed, a worker of ordinary skill in this art would recognize that certain modifications would come within the scope of this invention. For that reason, the following claims should be studied to determine the true scope and content of this invention.

The invention claimed is:

1. A measurement system for a vehicle comprising:
    a first camera defining a field of view having a corresponding optical axis;
    a motion detection sensor mechanically connected to an application specific integrated circuit (ASIC) of the first camera such that motion of the ASIC corresponds to motion of the optical axis in a one to one fashion and the motion detection sensor is configured to detect motion of the optical axis, the ASIC being configured to output a fused data set comprising a combination of image data generated by the first camera and motion data generated by the motion detection sensor;
    a controller in communication with the ASIC, the controller including at least a blockage detection system and being configured to receive a motion sensor output and a camera output, and configured to fuse the motion sensor output and the camera output thereby creating a fused data set, the controller being configured to receive the fused data set, the controller being configured to analyze the fused data set using a machine learning based analysis, and the machine learning based analysis being configured to determine an orientation of the camera and alert an operator in response to the first camera facing an incorrect direction; and
    wherein the controller is configured to provide the fused data set to the blockage detection system, and wherein the blockage detection system is configured to compare image based motion detection and sensor based motion detection of the fused data to determine when the camera is at least partially blocked.

2. The measurement system of claim 1, wherein the motion detection sensor includes one of an accelerometer, a gyroscope, and an inclinometer.

3. The measurement system of claim 1, wherein the fused data is time correlated data.

4. The measurement system of claim 1 wherein the fused data set is created using an automotive safety integration level (ASIL) decomposition fusion.

5. The measurement system of claim 1, wherein the fused data set is provided to at least one of a camera orientation monitor system, an object detection system, a camera misalignment system, a field of view adjustment system, an object detection redundancy system, an image stabilization system, an end of line calibration system, a tamper recognition system, and an automatic camera panning system, and a camera displacement detection system.

6. The measurement system of claim 5, wherein the fused data set is provided to the camera displacement detection system, and wherein the camera displacement detection system is configured to compare a speed of motion detected via image analysis with a speed of motion detected via sensor analysis and determine a camera displacement has occurred in response to the speed of motion detected via the image analysis exceeding speed of the motion detected via the sensor analysis by a predetermined amount.

7. The measurement system of claim 1, further comprising a plurality of second cameras, each of the plurality of second cameras defining a field of view having a corresponding optical axis, and a plurality of motion detection sensors each of the motion detection sensors in the plurality of motion detection sensors being mechanically fixed to a corresponding one of the second cameras in the plurality of second cameras via a corresponding application specific integrated circuit (ASIC), wherein a motion of each camera in the plurality of second cameras and a motion of the first camera is determined independently of the motion of each other camera.

8. The measurement system of claim 7, wherein each of the corresponding ASICs are configured to output a fused data set comprising a combination of image data generated by the corresponding camera and motion data generated by the motion detection sensor.

9. The measurement system of claim 1, wherein the blockage detection system is configured to determine that the camera is at least partially blocked in response to the image based motion detection system detecting no motion and the sensor based motion detection system detecting motion.

10. A method for detecting a blocked camera lens for a vehicle comprising:
    receiving image data and inertial motion unit (IMU) data from a camera system, the camera system including a motion detection sensor mechanically connected to an application specific integrated circuit (ASIC) of a first camera such that motion of the ASIC corresponds to motion of the optical axis in a one to one fashion and the motion detection sensor is configured to detect motion of the optical axis, the ASIC being configured to output a fused data set comprising a combination of image data generated by the first camera and motion data generated by the motion detection sensor;
    analyzing the IMU data to detect motion of the camera system using a sensor based motion detection system including a controller configured to receive the fused data set;
    analyzing the fused data set to detect motion of the camera using an image based machine learning motion detection analysis, the machine learning motion detection analysis being configured to determine at least an orientation of the camera and alert an operator in response to the first camera facing an incorrect direction; and
    determining a presence of an at least partially blocked lens in response to the image based motion detection analysis indicating no motion and the sensor based motion detection indicating motion.

11. The method of claim 10, wherein the camera system includes a first camera defining a field of view having a corresponding optical axis and a motion detection sensor mechanically fixed to the first camera such that the motion detection sensor is configured to detect motion of the optical axis.

12. The method of claim 10, wherein the image based motion detection analysis includes:
    identifying a reference in a first frame of the image data;
    identifying the reference in a second frame of the image data; and
    determining that the camera system is in motion in response to a change in position of the reference between frames being in excess of a threshold.

13. The method of claim 12, wherein the second frame is subsequent to the first frame.

14. The method of claim 10, wherein the image data and the IMU data are fused while determining the presence of an at least partially blocked lens.

15. A method for detecting a displaced camera system for a vehicle comprising:
    Receiving, at a controller, fused data including an image portion and an inertial motion unit (IMU) portion from a camera system, the camera system including a motion detection sensor mechanically connected to an application specific integrated circuit (ASIC) of a first camera such that motion of the ASIC corresponds to motion of the optical axis in a one to one fashion and the motion detection sensor is configured to detect motion of the optical axis, and the ASIC being configured to output a fused data set comprising a combination of image data generated by the first camera and motion data generated by the motion detection sensor;

analyzing the image portion using an image based motion detection system of the controller and determining at least one parameter of motion in at least one object within the image;

analyzing the IMU portion using a sensor based motion detection system of the controller and determining at least one parameter of motion of the IMU;

comparing the at least one parameter of motion of the at least one object in the image and the at least one parameter of motion of the IMU, and determining a camera system displacement has occurred when the at least one parameter of motion of the at least one objection differs from the motion of the IMU by at least a predefined amount; and analyze the fused data set using a machine learning based analysis, the machine learning based analysis being configured to determine an orientation of the camera and alert an operator in response to the first camera facing an incorrect direction.

16. The method of claim 15, wherein the at least one parameter is a speed of motion.

17. The method of claim 15, wherein the at least one object within the image is at an outer periphery of the image.

18. The method of claim 15, further comprising determining an at least partial blockage of the camera in response to the image based motion detection system detecting no motion and the sensor based motion detection system detecting motion.

* * * * *